TRANSMISSION SYSTEM

Filed Oct. 16, 1958 2 Sheets-Sheet 1

INVENTOR
CHARLES BEUCHER
BY
AGENT

Nov. 27, 1962 C. BEUCHER 3,066,201

TRANSMISSION SYSTEM

Filed Oct. 16, 1958 2 Sheets-Sheet 2

INVENTOR
CHARLES BEUCHER

BY [signature]
AGENT 3,066,201
TRANSMISSION SYSTEM
Charles Beucher, St. Brieuc, France, assignor to North American Philips Company, Inc., New York, N.Y., a corporation of Delaware
Filed Oct. 16, 1958, Ser. No. 767,644
Claims priority, application France Oct. 17, 1957
5 Claims. (Cl. 179—170.2)

This invention relates to a transmission system for use in radiotelephone communications in which there is connected to the two-wire end on the one hand a transmitter branch including a relay acting as a transmitter suppressor and on the other hand a receiver branch including a relay acting as a receiver suppressor, these suppressors being controlled jointly and oppositely by a control voltage generator.

The use of such a transmission system in principle promotes a smooth handling of traffic, however, it has been found that disturbing alternating voltages and overflow phenomena can interfere with satisfactory operation of the transmission systems. For example, under certain conditions with open receiver suppressor, the incoming signals which through the leakage of the transmission system reach the control voltage rectifier of the control voltage generator connected to the receiver branch, can render the receiver suppressor non-conductive and this again causes the voltage at the control voltage rectifier connected to the transmitter branch to collapse and renders the receiver suppressor conductive, so that the transmitter and receiver suppressors are periodically rendered conductive and non-conductive. The described overflow phenomenon, which is due to the fact that incoming speech simulates outgoing speech, impairs the intelligibility of the conversation.

It is an object of the present invention to provide a transmission system of the kind described in the preamble which is very satisfactory in practice, the insensitiveness to disturbances being materially improved.

The hybrid system in accordance with the invention is characterized in that the control voltage generator comprises a control voltage rectifier connected to the receiver branch and a phase detector connected, through a coupling network, to the two-wire lines, the coupling network being provided with series resistors connected one in each wire of the two-wire line and with a parallel resistor connected between opposed ends of the two series resistors, while the voltage at one of the ends of one of the series resistors and the voltage at a tapping on the parallel resistor are supplied to the input circuit of the phase detector, the control voltages for the transmitter and receiver suppressors being taken from the output circuit of the phase detector and from the output circuit of the control voltage rectifier connected to the receiver branch.

Figure 1:
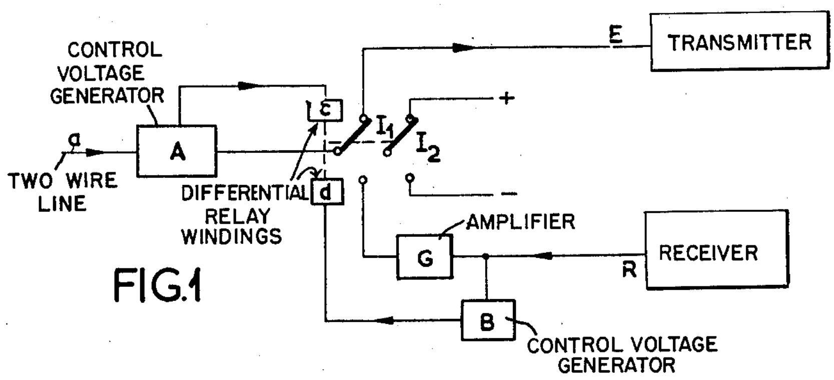
Figure 2:
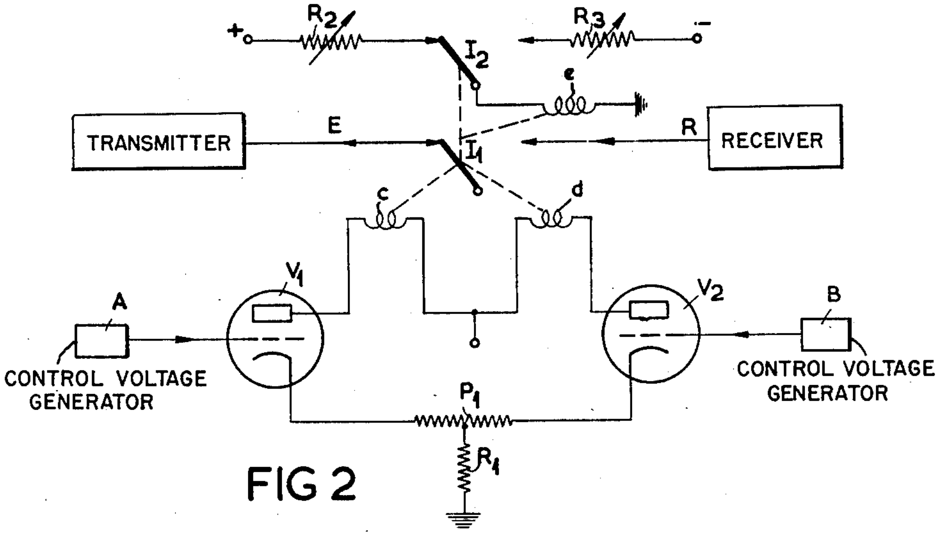
Figure 3:
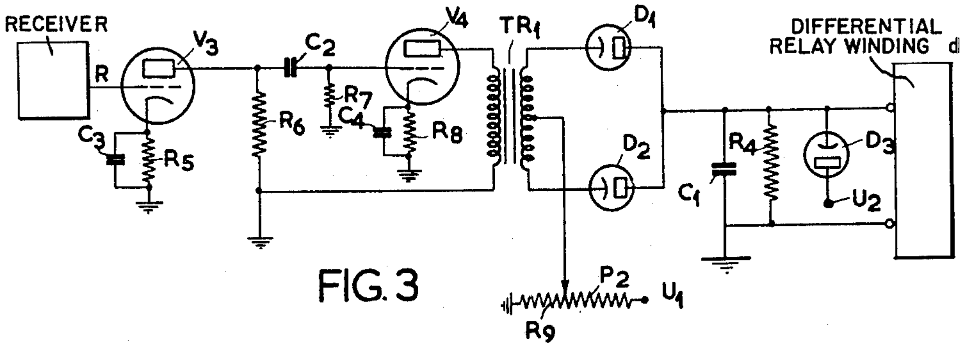
Figure 4:
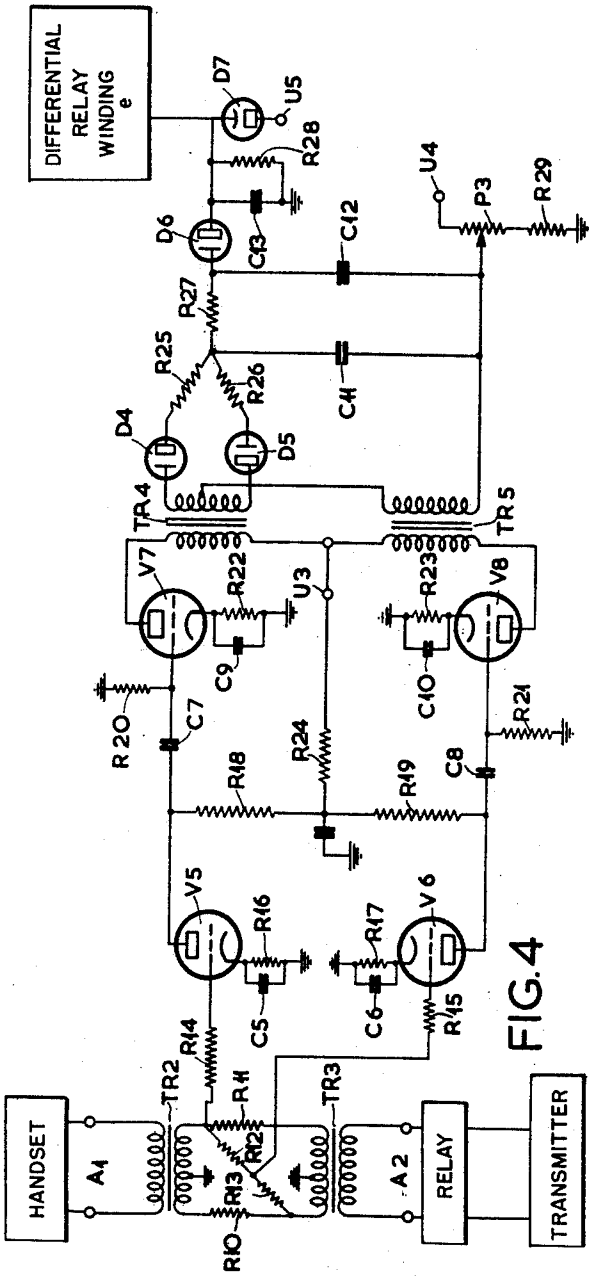

In order that the invention may readily be carried out, an embodiment thereof will now be described more fully with reference to the accompanying diagrammatic drawings, in which FIG. 1 shows in block-schematic form the general structure of a preferred system in accordance with the invention, while FIGS. 2, 3 and 4 are circuit diagrams illustrating in more detail the elements used in the said system.

In FIG. 1, reference symbol *a* denotes the two-wire end of a hybrid system to which are connected a transmitter branch E which may include amplifiers and also a receiver branch R including a receiver amplifier G, the transmitter branch E and the receiver branch R each being provided with a relay acting as a suppressor. The transmitter and receiver suppressors are controlled jointly and oppositely by a control voltage generator comprising an arrangement B connected to the receiver branch R and an arrangement A connected to the two-wire end *a* of the hybrid system, this control voltage generator generating a control voltage which, when speech signals are received through the receiver branch R, renders the receiver suppressor conductive and the transmitter suppressor non-conductive, and which conversely, when speech signals are transmitted through the transmitter branch E, renders the transmitter suppressor conductive and the receiver branch R non-conductive.

The generation of the control voltages required for the suppressor operation described will now be described more fully with reference to FIGS. 3 and 4, which show the arrangements B and A of the control voltage generator in greater detail.

FIG. 3 shows the arrangement B which is connected to the receiver branch and substantially comprises a push-pull connected control voltage rectifier having diodes $D_1$ and $D_2$ which are biased at a suitable value by means of a voltage divider $R_9$, $P_2$ connected between earch and a positive terminal $U_1$ of a bias voltage supply. The received signals obtained from the receiver branch R are amplified in a first amplifier $V_3$ having an output resistor $R_6$ and supplied, through a coupling capacitor $C_2$ and a grid resistor $R_7$, to the control grid of a second amplifier $V_4$ which, through an output transformer $TR_1$, is coupled to the push-pull rectifier $D_1$, $D_2$. The grid bias voltage of the amplifiers $V_3$ and $V_4$ are adjusted to suitable values by means of capacitively shunted cathode resistors $C_3$, $R_5$ and $C_4$, $R_8$, respectively.

In the output circuit of the rectifier arrangement $D_1$, $D_2$, which circuit comprises a resistor $R_4$ shunted by a capacitor $C_1$, incoming speech signals produce by rectification a negative voltage which, through a limiter, is supplied to the output terminals, so that at these terminals a voltage is set up independently of the level of the incoming speech signals. As a limiter use is made of a diode $D_3$ which is biased by a suitable bias voltage $U_2$ of, for example, −8 volts.

If no speech signals are received, the capacitor $C_1$ discharges through the resistor $R_4$ at a rate determined by the time constant of the resistor $R_4$ and the capacitor $C_1$. Thus the output voltage of the arrangement B of FIG. 3 provides an indication of the presence or absence of speech signals in the receiver branch R.

The component parts used in a system which was extensively tested in practice had the following values:

| | KΩ |
|---|---|
| $R_4$ | 500 |
| $R_5$ | 2.2 |
| $R_6$ | 100 |
| $R_7$ | 500 |
| $R_8$ | 0.9 |
| $R_9$ | 2 |
| $P_2$ | 50 |

| | μf. |
|---|---|
| $C_1$ | 0.1 |
| $C_2$ | 0.01 |
| $C_3$ | 20 |
| $C_4$ | 20 |

The transformation ratio of the transformer $TR_1$ was 1:3 while the voltage $U_1$ was 105 v.

FIG. 4 shows the arrangement A connected to the two-wire end, which arrangement is provided with a phase detector which is designed as a push-pull mixer stage comprising diodes $D_4$ and $D_5$ and is connected, through a coupling network, to the two-wire line $A_1$, $A_2$, the end $A_1$ being connected to the hand-set and the end $A_2$ to the transmitter branch E and the receiver branch R. As is shown in the figure, the coupling network connected between the secondary windings of transformers $TR_2$ and $TR_3$ comprises series resistors $R_{10}$ and $R_{11}$ connected each in one of the two-wire lines and a parallel resistor $R_{12}$, $R_{13}$ connected between opposed ends of the two series resistors $R_{10}$ and $R_{11}$, the end of the series resistors $R_{11}$ connected to the resistor $R_{12}$ and the junction of the parallel resistors $R_{12}$, $R_{13}$ being connected to the input circuit of the phase detector $D_4$, $D_5$ through parallel-connected channels.

In the embodiment shown, the signals appearing at the junction of the resistor $R_{18}$ and supplied, through a coupling capacitor $C_7$ are a grid resistor $R_{20}$, to a second amplifier $V_7$, which is connected, through an output transformer $TR_4$, to the phase detector $D_4$, $D_5$. The junction of the resistors $R_{11}$, $R_{12}$ is connected, through a decoupling resistor $R_{14}$, to the control grid of the tube $V_5$, the grid bias voltages of the tubes $V_5$ and $V_7$ being obtained by means of capacitively shunted resistors $C_5$, $R_{16}$ and $C_9$, $R_{22}$, respectively.

The channel connected to the junction of the parallel resistors $R_{12}$, $R_{13}$ is substantially built up in the same manner and comprises, in succession, a decoupling resistor $R_{15}$, a first amplifier $V_6$ having a cathode resistor $R_{17}$ shunted by a capacitor $C_6$ and an output resistor $R_{19}$, a coupling capacitor $C_8$, a grid resistor $R_{21}$ and a second amplifier $V_8$ having a cathode resistor $R_{23}$ shunted by a capacitor $C_{10}$ and an output transformer $TR_5$, the ends of the secondary winding of this transformer being connected to a center tap on the secondary of the transformer $TR_4$.

The supply voltages for the amplifiers $V_5$, $V_6$, $V_7$, $V_8$ are taken from the positive terminal $U_3$ of a voltage supply source, this terminal $U_3$ being connected, through the primaries of the transformers $TR_4$ and $TR_5$, to the anodes of the tubes $V_7$ and $V_8$ and also, through a series resistor $R_{24}$ and a decoupling capacitor, to the anodes of the tubes $V_5$ and $V_6$.

In the embodiment shown, the diodes $D_4$ and $D_5$ of the push-pull mixer stage designed as a phase detector are connected, through series resistors $R_{25}$, $R_{26}$, to a low-pass filter comprising a series resistor $R_{27}$ and parallel capacitors $C_{11}$, $C_{12}$, the output of the low-pass filter being connected, through a diode $D_6$ which is connected as a threshold device, the threshold voltage being taken from a voltage divider $P_3$, $R_{29}$ connected between earth and a positive terminal $U_4$ of, say, 20 v., to the parallel combination of a resistor $R_{28}$ and a capacitor $C_{13}$. In the manner described with reference to FIG. 3, the voltage set up across the network $R_{28}$ and $C_{13}$ is limited, by means of a biassed diode $D_7$ having a bias supply $U_5$, to a fixed value which is also —8 v.

The operation of the arrangement shown in FIG. 4 will now be described more fully.

In the embodiment shown of the coupling network $R_{10}$, $R_{11}$, $R_{12}$, $R_{13}$, the voltages supplied to the tubes $V_5$, $V_6$ are either in phase or in phase opposition according to the direction in which the speech signals pass through the coupling network, so that a positive or a negative direct voltage is produced according to the fact whether outgoing or incoming speech signals pass through the mixer stage $D_4$, $D_5$ acting as a phase detector. The arrangement is such that with outgoing speech a negative output voltage is produced which can pass through the threshold device $D_6$ and is limited by the limiter $D_7$ to a fixed value of —8 v., while with incoming speech the produced positive mixer voltage is cut off by the threshold device. Thus, the arrangement shown in FIG. 4 only produces an output voltage with outgoing speech; with incoming speech or in the absence of speech oscillations, no output voltage is produced.

The arrangement shown in FIG. 4, in which the criterion for outgoing and incoming speech consists of a polarity reversal of the output voltage of the mixer stage $D_4$, $D_5$ acting as a phase detector, is materially independent of the variations of the component parts used or of the ageing of the tubes, for the polarity of the output voltage depends substantially only upon the phase of the oscillations supplied to the mixer stage $D_4$, $D_5$ and not upon the amplitude of these oscillations. Furthermore the polarity reversal of the output voltage of the phase detector $D_4$, $D_5$ proves to be a highly sensitive criterion, so that the damping introduced in the two-wire channel by the coupling network $R_{10}$, $R_{11}$, $R_{12}$, $R_{13}$, can be reduced to a minimum.

The values of the component parts of an arrangement of the kind shown in FIG. 4, which are extensively tested in practice, are:

| | KΩ |
|---|---|
| $R_{10}$, $R_{11}$ | 1 |
| $R_{12}$, $R_{13}$ | 50 |
| $R_{14}$, $R_{15}$ | 250 |
| $R_{16}$, $R_{17}$ | 2.2 |
| $R_{18}$, $R_{19}$ | 100 |
| $R_{20}$, $R_{21}$ | 500 |
| $R_{22}$, $R_{23}$ | 0.9 |
| $R_{24}$ | 5 |
| $R_{25}$, $R_{26}$ | 200 |
| $R_{27}$ | 20 |
| $R_{28}$ | 1000 |
| $R_{29}$ | 2 |
| $P_3$ | 50 |

| | μf. |
|---|---|
| $C_5$, $C_6$ | 20 |
| $C_7$, $C_8$ | 0.01 |
| $C_9$, $C_{10}$ | 20 |
| $C_{11}$, $C_{12}$ | 0.02 |
| $C_{13}$ | 0.2 |

The transformation ratios of the transformers $TR_2$ and $TR_3$ are 1, while the transformation rations of the transformer $TR_4$ and $TR_5$ are 1/3.

When the control voltage generator A, B exhaustively described with reference to FIGS. 3 and 4 is used in the transmission system shown in FIG. 1, with outgoing speech the arrangement A produces a negative output voltage and the control voltage rectifier B produces no output voltage, as has been described fully hereinbefore, so that the transmitter suppressor is rendered conductive and the receiver suppressor is rendered non-conductive. Conversely, with incoming speech through the receiver branch R, the control voltage rectifier B produces a negative output voltage and the mixer stage $D_4$, $D_5$ in the arrangement A produces a positive output voltage which is not transmitted by the threshold device $D_6$ to the output terminals of the arrangement A, so that the receiver suppressor is rendered conductive and the transmitter suppressor is rendered non-conductive. As has been described hereinbefore, the output voltage of the arrangement A connected to two-wire channel depends upon the direction of the speech oscillations so that incoming speech is prevented from simulating outgoing speech in the arrangement A and hence overflow phenomena are materially reduced.

The arrangement shown of the circuit A, B of the control voltage generator permits of a considerable simplification of the transmission system, for the transmitter and receiver suppressors and the transmission transformer can be replaced by a single differential relay comprising energizing windings *c* and *d* connected to the outputs of the arrangements A and B and a switch contact $I_1$ which connects the two-wire line *a* either to the transmitter branch E or to the receiver brach R, in a manner such that under the control of the control voltage generator A, B the two-wire line *a* is connected through the switch contact $I_1$, with incoming speech, to the receiver branch R and, with outgoing speech, to the transmitter branch E.

A further improvement of the transmission system described is obtained by the use of a differential relay having a second switch contact $I_2$, which on changing over reverses the direction of the current flowing through an auxiliary winding so that the differential relay has two stable equilibrium positions without a preferred position.

This arrangement is shown in more detail in FIG. 2, similar elements being denoted by like reference symbols.

As is shown in this figure, the output circuits of the arrangements A and B of the control voltage generator are connected to the control grid of two amplifier tubes $V_1$, $V_2$ the cathodes of which are connected, through an adjustable resistor $P_1$, to a common cathode resistor $R_1$, while the two differential windings *c* and *d* are connected in the anode circuits of the tubes $V_1$, $V_2$. The auxiliary winding *e* of the differential relay is connected, according to the position of the switch contact $I_2$, either through an adjustable resistor $R_2$ to the positive terminal or through an adjustable resistor $R_3$ to the negative terminal of a voltage supply source.

With outgoing speech the differential relay assumes the position shown in the figure: the switch contact $I_1$ is connected to the transmitter branch E while the auxiliary winding *e* is connected, through the switch contact $I_2$, to the positive terminal of the voltage supply source, so that the differential relay remains in the position shown when the outgoing speech ceases and also when outgoing and incoming speech signals are produced simultaneously. A change-over of the differential relay, so that the switch contact $I_1$ is connected to the receiver branch R and the auxiliary winding *e*, through the switch contact $I_2$, to the negative terminal of the voltage supply source, only takes place in the absence of outgoing speech and the simultaneous presence of incoming speech. In this latter event, the differential relay remains in the last-mentioned position when the incoming speech ceases or outgoing and incoming speech signals are present simultaneously, a change-over being produced only by the absence of incoming speech and the simultaneous presence of outgoing speech.

It has been found in practice that by this step disturbances in the operation of the transmission system are further reduced. Especially undesirable change-over, for example between two words in a sentence, is materially reduced so that the intelligibility is appreciably improved.

What is claimed is:

1. A control voltage generator circuit for a transmission system of the type having a two-wire line, a transmitter branch connected to the two-wire line and including first relay contact means acting as a transmitter suppressor, a receiver branch connected to the two-wire line and including second relay contact means acting as a receiver suppressor, and in which said control voltage generator circuit is connected to jointly and oppositely control said relay contact means; said circuit comprising control voltage rectifier means connected to said receiver branch, a series resistor connected in each of the lines of said two-wire line, a parallel resistor connected between opposite ends of said series resistors, phase detector means for comparing the phase of the voltage at one end of one of said series resistors and the voltage at a tap on said parallel resistor, said phase detector means being connected to operatively control said first relay contact means in response to signals transversing said two wire line in one direction, and said control voltage rectifier means being connected to operatively control said second relay contact means in response to signals received by said receiver branch.

2. The circuit of claim 1, in which the connection between said phase detector means and said first relay contact means comprises threshold device means for passing voltages only of a given polarity.

3. A transmission system comprising a two-wire line, a transmitter branch connected to said two-wire line by way of first relay contacts, a receiver branch connected to said two-wire line by way of second relay contacts, control voltage rectifier means connected to said receiver branch providing an output voltage responsive to incoming signals in said receiver branch, a series resistor connected in each of the lines of said two-wire line, a parallel resistor connected between opposite ends of said series resistors, phase detector means having an input circuit connected between one end of one of said series resistors and a tap on said parallel resistor, said phase detector means providing an output voltage responsive to the phase of the voltage between said one end of said series resistors and said tap, and means operatively connecting the outputs of said phase detector means and control rectifier means to relay means for operating said first and second relay contacts whereby said relay contacts are operated jointly and oppositely.

4. The system of claim 3, comprising a differential relay having first and second windings, means connecting the outputs of said phase-detector means and control rectifier means to said first and second windings, respectively, said first and second contacts being contacts of said differential relay.

5. A transmission system comprising a two-wire line, a transmitter branch connected to said two-wire line by way of first relay contacts, a receiver branch connected to said two-wire line by way of second relay contacts, control voltage rectifier means connected to said receiver branch providing an output voltage responsive to incoming signals in said receiver branch, means providing an output voltage having a phase dependent upon the direction of current flow in said two-wire line, phase detector means connected to said last-mentioned means, and means operatively connecting the outputs of said phase detector means and control rectifier means to relay means for operating said first and second relay contacts.

References Cited in the file of this patent

UNITED STATES PATENTS

| | | |
|---|---|---|
| 1,706,472 | Wright | Mar. 26, 1929 |
| 2,319,717 | Bjornson | May 18, 1943 |
| 2,468,552 | Herrick | Apr. 26, 1949 |
| 2,696,529 | Bachelet | Dec. 7, 1954 |

UNITED STATES PATENT OFFICE
CERTIFICATE OF CORRECTION

Patent No. 3,066,201 November 27, 1962

Charles Beucher

It is hereby certified that error appears in the above numbered patent requiring correction and that the said Letters Patent should read as corrected below.

In the heading to the printed specification, line 7, for "Claims priority, application France Oct. 17, 1957" read -- Claims priority, application France Oct. 19, 1957 --.

Signed and sealed this 8th day of October 1963.

(SEAL)
Attest:

ERNEST W. SWIDER
Attesting Officer

EDWIN L. REYNOLDS
Acting Commissioner of Patents